T. B. HENRY.
SPECULUM OR VAGINAL SYRINGE.
APPLICATION FILED MAY 23, 1919.
1,326,342.
Patented Dec. 30, 1919.
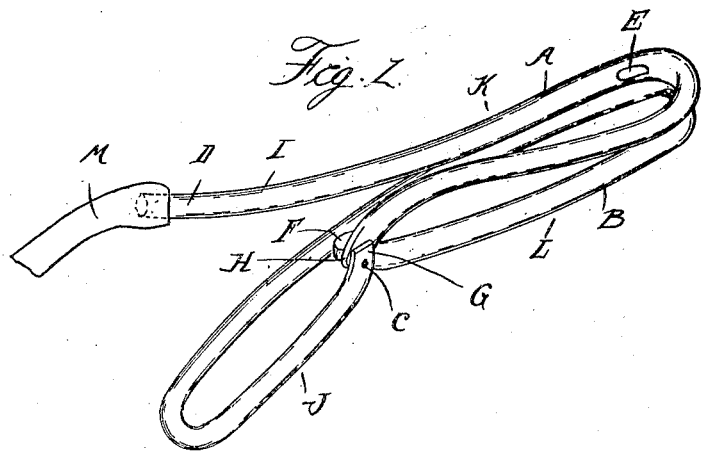
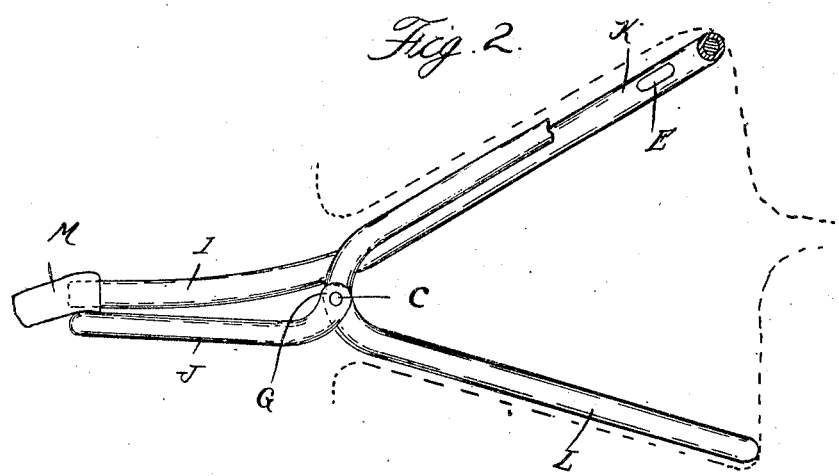
Inventor
Thomas B. Henry

UNITED STATES PATENT OFFICE.

THOMAS B. HENRY, OF NORTHVILLE, MICHIGAN.

SPECULUM OR VAGINAL SYRINGE.

1,326,342.  Specification of Letters Patent.  Patented Dec. 30, 1919.

Application filed May 23, 1919.  Serial No. 299,202.

*To all whom it may concern:*

Be it known that I, THOMAS B. HENRY, a citizen of the United States of America, residing at Northville, in the county of Wayne and State of Michigan, have invented certain new and useful Improvements in Specula or Vaginal Syringes, of which the following is a specification, reference being had therein to the accompanying drawings.

The invention relates to speculums or vaginal syringes, and it is the object of the invention to obtain a simple and effective instrument, as hereinafter set forth.

In the drawings,—

Figure 1 is a perspective view of the instrument; and

Fig. 2 is a side elevation, showing the instrument in dilating position.

A and B are looped members which are pivotally connected to each other at C. Preferably, these members are formed of metallic tubing, and the member A has one portion thereof which serves as a liquid conduit from its outer end D to a discharge port E. This discharge port is located on the inner side of the loop and near the end thereof. The member B is formed as a double loop with bent overlapping end portions F and G for receiving the pivot pin C and for embracing between them the bent end H of the member A. The arrangement is such that the two members A and B have portions I and J outside of the pivot C that may be used as handles and the jaw portions K and L inside of the pivot C which may be expanded, as shown in Fig. 2.

The instrument may be constructed at small cost, and in use can be readily inserted and then expanded as shown in Fig. 2. In expanded condition, water or other cleansing fluid which is supplied through the flexible conduit M to the end D will be conducted through the member A to the orifice E, where it will be discharged in such a manner as to thoroughly cleanse the parts.

Attention is directed to the fact that the instrument being formed of round tubing and having all of its bends rounded there are no sharp projections to cause injury.

What I claim as my invention is,—

1. A speculum or vaginal syringe, comprising pivotally-connected members, one of said members being in the form of a double loop with spaced ends and the other member being in the form of a single loop with the end embraced by the ends of the first-mentioned member, a pivot connecting said ends, and a liquid supply conduit connected with the second member, said member having a discharge port on the inner side of the loop.

2. A speculum or vaginal syringe, comprising two members pivotally connected to each other, one of said members being in the form of a double loop having spaced ends intermediate said loops, the other member being in the form of a single loop and being tubular to form a conduit from its outer end, a port at the inner side of the loop, the return portion of the loop of said last-mentioned member being embraced by the ends of the first-mentioned member, and a pivot connecting said ends.

3. A speculum or vaginal syringe, comprising two members formed of tubing, one of said members having a single loop therein and the other member being bent to form a double loop with the ends spaced from each other intermediate said loops, one end of said single loop member being embraced by the ends of the double loop and pivotally connected thereto, and the other end of said single loop member being connected to a flexible conduit and forming a conduit extending to a port on the inner side of said loop.

In testimony whereof I affix my signature.

THOMAS B. HENRY.